United States Patent [19]

Chak

[11] Patent Number: 4,761,215

[45] Date of Patent: Aug. 2, 1988

[54] DEVICE FOR SILVERIZING WATER

[76] Inventor: Maryan Chak, 2901 Ocean Pkwy., Brooklyn, N.Y. 11235

[21] Appl. No.: 44,321

[22] Filed: Apr. 30, 1987

[51] Int. Cl.$^4$ .............................................. C25C 7/00
[52] U.S. Cl. .................................... 204/269; 204/275; 204/286
[58] Field of Search ............... 204/267, 269, 228, 149, 204/275, 286; 210/748

[56] References Cited

U.S. PATENT DOCUMENTS 1,065,361  6/1913  Hartman ............................. 204/269
3,923,632  12/1975  Eibl .................................... 204/149
4,274,939  6/1981  Bjäreklint .......................... 204/269

Primary Examiner—John F. Niebling
Assistant Examiner—Kathryn Rubino
Attorney, Agent, or Firm—Ilya Zborovsky

[57] ABSTRACT

A device for silverizing water has a plurality of positive silver-containing electrodes and a plurality of negative electrodes, and a housing composed of a plurality of housing portions each having a receptacle for receiving a respective one of the electrodes, wherein the housing portions are substantially identical and can be assembled with and disassembled from one another.

6 Claims, 1 Drawing Sheet

DEVICE FOR SILVERIZING WATER

BACKGROUND OF THE INVENTION

The present invention relates to a device for silverizing water.

Devices of the above mentioned general type are known in the art. The known silverising device includes a plurality of positive silver-containing electrodes and a plurality of negative electrodes alternatingly arranged in a housing provided with an inlet and an outlet for water. Silver ions produced by the positive electrodes saturate water with silver. In the known devices there are significant problems with its cleaning. The parts of the device become covered with silver deposits, and their removal is difficult. Water can boil in the openings at the inlet and outlet of the device which can lead to a complete interruption of process. The device cannot vary its structure once the device is produced and assembled.

SUMMARY OF THE INVENTION

Accordingly, it is an object of the present invention to provide a device for silverizing water which avoids the disadvantages of the prior art.

In keeping with these objects and with others which will become apparent hereinafter, one feature of the present invention resides, briefly stated, in a device for silverizing water which has a plurality of negative and positive electrodes and a plurality of housing portions each provided with a receptacle with at least one electrode and arrangeable over one another to form a composite housing which can be easily disassembled.

When the device is designed in accordance with the present invention, it can be easily disassembled for cleaning. Electrodes of different types can be held in the same housing portions, to adjust the device to the required conditions. Some housing portions can even be left without electrodes so that a larger space can be provided between the respective electrodes for mixing. The service life of the device is therefore increased, and its performance is improved, which makes the device much more effective in use.

The novel features of the present invention are set forth in particular in the appended claims. The invention itself, however, both as to its construction and manner of operation, will be best understood from the following description of preferred embodiments, which is accompanied by the following drawings.

DESCRIPTION OF A PREFERRED EMBODIMENT

Figure 1:
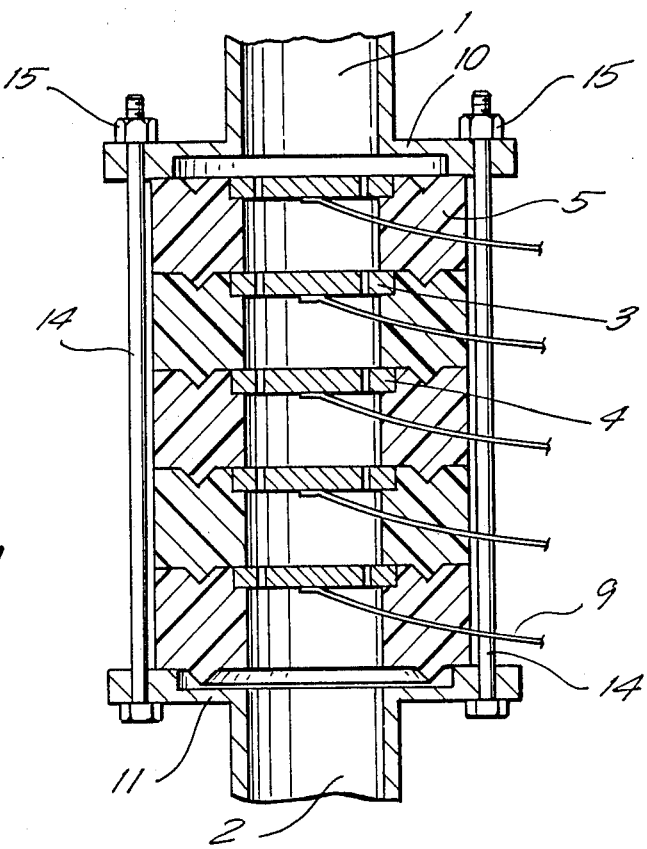
FIG. 1 is a view of a device for silverizing water in accordance with the present invention.
Figure 2:
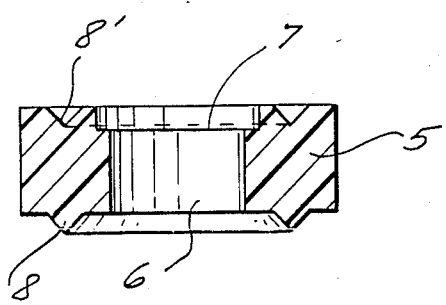
FIG. 2 is a cross section of one housing portion with an electrodes arranged therein.
Figure 3:
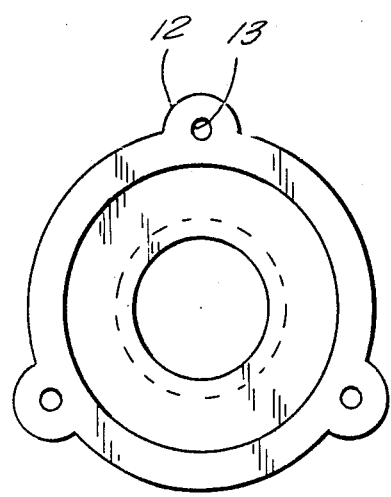
FIG. 3 is a plan view of one of covers to be arranged at the top and the bottom of the device.

A device for silverizing water in accordance with the present invention includes a housing with an inlet 1 and an outlet 2 for water. A plurality of electrodes are arranged in the housing and include negative electrodes 3 and positive electrodes 4 which are arranged alternatingly with one another. The positive electrodes 4 are silver-containing elements. When current is supplied to the electrodes and water passes through the device from its inlet to its outlet, the water is saturated by silver ions from the positive electrodes, as disclosed for example in the patent application Ser. No. 894,900. The electrodes can be different designs and can have a plurality of through going openings, as also disclosed in the above mentioned application.

In accordance with the present invention, the housing is composed of a plurality of housing portions 5 which are substantially identical. Each housing portion 5 has a through going central opening for passing of water therethrough. Each housing portion also has a receptacle for receiving a respective one of the electrodes, and formed as a recess 7. The housing portions 5 can be composed of plastic. Each of them has an annular projection 8 formed for example on its lower surface, and an annular groove 8' formed for example on its upper surface. An electrical conductor 9 extends through each housing portion and can be fixedly embedded in it, to form a unit.

The device of the invention also has an upper cover 10 and a lower cover 11 provided with lateral projections 12 which have through openings 13, for passing connecting screws 14 therethrough.

The device is assembled in a very simple manner. The electrodes 3 are placed into the recesses 7 of the respective housing portions 5. Then the housing portions 5 are placed over one another so that the annular projection 8 of each housing portion 5 engages into the annular groove q of the next housing portion. Then the covers 10 and 11 are placed at both ends of the device, the screws 14 passed through the openings 13 of the projections 12 of the covers and tightened by nuts 15. The electrical conductors 10 contact the respective electrodes 3. The electrodes 3 are clamped between a lower surface of an upper housing portion and the bottom surface of the recess of a lower housing portion.

The device can be disassembled for cleaning, adjusting etc. purposes, in a reversed order, in the same simple manner.

The invention is not limited to the details shown since various modifications and structural changes are possible without departing in any way from the spirit of the invention.

What is desired to be protected by Letters Patent is set forth in particular in the appended claims:

1. A device for silverizing water, comprising
    passage forming means having an inlet, an outlet and a passage extending between said inlet and said outlet so that said inlet and said outlet are open during silverizing of water and water can run from said inlet to said outlet through said passage;
    a plurality of electrodes including alternatingly arranged silver-containing anodes, and cathodes formed and located relative to said inlet and said outlet so that water running from said inlet to said outlet through said passage is guided by said electrodes and continuously saturated by ions of silver emerging from said anodes; and
    a plurality of housing portions which are substantially identical and arrangeable over one another so as to form a composite housing which can be easily disassembled into said housing portions when needed, each of said housing portions having an upper side and a lower side, each of said housing portions being provided with means for fitting them in one another, with means for forming a protion of said passage, means for supporting a respective one of said electrodes, and means for connecting a respective one of said electrodes with an electrical source, said means for fitting being formed as a recess provided on one of said sides and a complementary projection provided on the other of said sides of each of said housing portions, said means for forming a portion of said passage being formed as a central opening provided in each of said housing portions, said means for supporting a respective one of said electrodes including a receptacle provided on one of said sides of each of said housing portions, and said means for connecting a respective one of said electrodes including an electrical conductor arranged in each of said housing portions in contact with a respective one of said electrodes.

2. A device for silverizing running water as defined in claim 1, wherein said recess, said projection, said central opening and said receptacle in each of said housing portions each have a circular shape and arranged concentrically relative to one another.

3. A device for silverizing running water as defined in claim 1; and further comprising means for connecting said housing portions with one another, when they are arranged over one another.

4. A device for silverizing running water as defined in claim 3, wherein said housing portions have a side wall, said connecting means including an upper cover and a lower cover located above and below all of said housing portions, and a plurality of connecting members which connect said upper and lower covers with one another and extend laterally outside of said side wall of said housing portions.

5. A device for silverizing running water as defined in claim 1, wherein each of said housing portions has a through going opening, each of said electrical conductors extending through said through going opening of a respective one of said housing portions being in contact with a respective one of said electrodes.

6. A device for silverizing running water as defined in claim 1, wherein each of said electrical conductors is fixedly connected with a respective one of said housing portions so as to form a unit therewith, so that said housing portions are assembled and disassembled together with said electrical conductors, and in an assembled condition said electrical conductors are in contact with respective ones of said electrodes.

* * * * *